(12) United States Patent
Saiz

(10) Patent No.: US 6,780,797 B2
(45) Date of Patent: Aug. 24, 2004

(54) TEXTILE POSSESSING ANTILACERATION PROPERTIES

(75) Inventor: Carlos Saiz, Savoie (FR)

(73) Assignee: Tissage et Enduction Serge Ferrari SA, Saint Jean de Soudain (FR)

(*) Notice: Subject to any disclaimer, the term of this patent is extended or adjusted under 35 U.S.C. 154(b) by 43 days.

(21) Appl. No.: 10/086,863

(22) Filed: Mar. 4, 2002

(65) Prior Publication Data

US 2002/0123280 A1 Sep. 5, 2002

(30) Foreign Application Priority Data

Mar. 2, 2001 (FR) .............................................. 01 02908

(51) Int. Cl.⁷ .................................................. D03D 9/00
(52) U.S. Cl. .................. 442/3; 442/5; 442/6; 442/187; 442/229; 442/210; 442/212; 442/228; 442/379; 442/911
(58) Field of Search ............................ 442/3, 5, 6, 187, 442/229, 210, 212, 228; 428/379, 911

(56) References Cited

U.S. PATENT DOCUMENTS 2,962,057 A * 11/1960 Clarence ................. 139/425 R
5,973,268 A * 10/1999 Cheng ......................... 174/112

FOREIGN PATENT DOCUMENTS

| EP | 0 940 277 A1 | 9/1999 | |
| GB | 2293583 A * | 4/1996 | ............ B60P/7/04 |
| GB | 2 317 363 A1 | 9/1996 | |

* cited by examiner

Primary Examiner—Elizabeth M. Cole
(74) Attorney, Agent, or Firm—Browdy and Neimark, P.L.L.C.

(57) ABSTRACT

Textile (1) possessing antilaceration properties, which is made from synthetic cables (2) sheathed with a polymer material, such as polyvinyl chloride, and includes, in the warp direction and the weft direction, metal cables (3, 4) sheathed with a polymer material having a different color from that of the polymer material for sheathing the synthetic yarns, wherein the warp and weft metal cables (3, 4) are uniformly spaced by a distance of (d, l) of less than 80 millimeters.

15 Claims, 1 Drawing Sheet

TEXTILE POSSESSING ANTILACERATION PROPERTIES

TECHNICAL FIELD

The invention relates to the field of high-performance textiles and more particularly textiles possessing mechanical properties giving them resistance to laceration or the capability of detecting attempted laceration, these being called hereafter antilaceration properties. The invention is very particularly applicable in the field of tarpaulins in general, when the textile is used in combination with a coated fabric for example. It is also applicable when the textile is used as it is, to act as cladding for buildings or more generally for a vertical wall, partition or separation in constructions.

PRIOR ART

The need to give tarpaulins, especially truck tarpaulins, antilaceration properties, has given rise to various technical solutions.

Thus, it has already been proposed to produce tarpaulins by complexing a textile with a metal mesh made up from a sheathed metal strip. This solution has many drawbacks and especially the fact that, despite the use of quite an open mesh (with a typical mesh cell of 100 mm×100 mm) and containing little metallic material, this mesh very greatly stiffens the tarpaulin and makes it very difficult to handle when covering the truck with the tarpaulin. Furthermore, the completed mesh generally appears on the outside of the tarpaulin, which means that the protection is not actually concealed and leads one to believe that the truck is intended to transport valuable merchandise.

It has also been proposed to produce truck tarpaulins by coating a textile either composed entirely of metal cables or incorporating metal cables woven with other synthetic cables. These solutions also have many drawbacks. This is because when the textile is composed both in the warp direction and in the weft direction of cables strong enough and sufficiently closely meshed to withstand laceration, the weave has a very considerable relief, which necessarily means that a large amount of coating has to be deposited on each side of the metal textile in order, at the very least, to cover the top of the yarns. Such a coated textile is very heavy and practically impossible to handle during operations to cover the truck with the tarpaulin, especially in cold weather. It is also relatively complicated to cut and to make up. Moreover, since the metal reinforcing cables are incorporated right within the tarpaulin, it is necessary to create an entire range of different product part numbers in order to meet the thickness and color requirements of the various users seeking a new furnishing. In the case of an existing fleet of tarpaulined trucks, this solution means that the tarpaulins in use have to be completely replaced, even those which are only slightly worn. In addition, when a laceration cutting the cables appears, the entire wall of the tarpaulin has to be replaced, since repairs are not possible.

From the environmental standpoint, this type of textile construction makes it very difficult to recycle the materials because of the difficulty of separating the metal cables from the synthetic materials which surround them.

Finally, it is not generally necessary to reinforce a truck tarpaulin over its entire height, but only the accessible parts. The use of a textile having metal reinforcing cables over the entire height of the tarpaulin unnecessarily increases the cost of the latter and makes it difficult to make up, as already mentioned.

One problem that the invention therefore aims to solve is that of reinforcing tarpaulins without rendering the making-up operation difficult and complicated. Another problem that the invention aims to solve is that of being able to give a wide variety of textiles antilaceration properties, especially with regard to their mechanical properties, their dimensions, their colors and the markets in which they are used.

The same need for antilaceration properties exists in the case of elements similar to tarpaulins, such as claddings, and more generally, the various textile elements used in architecture to form the outer walls of tents, partitions or coverings. In this case, the textile elements may be impervious, as is the case with truck tarpaulins, but also apertured in order to allow the passage of light or to maintain visibility through them.

SUMMARY OF THE INVENTION

The invention therefore relates to a high-performance textile possessing antilaceration properties.

In accordance with the invention, such a textile is one made from synthetic cables sheathed with a polymer material, such as polyvinyl chloride, and includes, in the warp direction and the weft direction, metal cables sheathed with a polymer material having a different color from that of the polymer material for sheathing the synthetic cables, wherein the warp and weft metal cables are uniformly spaced by a distance of less than 80 millimeters.

In other words, the invention consists in using, as antilaceration textile, a textile made from sheathed cables among which are some metal cables, which thus define a square mesh cell whose sides are small enough to prevent the passage of a hand. Consequently, any laceration made by a cutting tool will be blocked by the metal cables, and the maximum dimensions over which the textile can be cut will be insufficient to let a criminal's hand or arm pass through it.

The use of a polymer material having a different color for the synthetic cables and for the metal reinforcing cables allows these reinforcing cables to be precisely located and therefore positioned appropriately with respect to the area to be protected.

This PVC sheathing may be obtained by extrusion or by coating. Of course, this sheathing is not limited to PVC but could be made of polyethylene (PE), polypropylene (PP), silicone or any other synthetic substance possessing the ad hoc properties.

In practice, the metal cables may advantageously be cables based on carbon steel wires, having a very high tensile strength, typically greater than 50 kilograms per square millimeter and preferably greater than 350 kg/mm$^2$.

In practice, the synthetic cables used may advantageously be composed of polyester yarns or glass yarns. The use of polyester yarns gives a certain strength to the areas lying between the metal reinforcing cables, together with good compatibility with the PVC coating.

According to another feature of the invention, the textile may include, in the warp or weft direction, electrically conducting yarns sheathed with a polymer material, such as polyvinyl chloride, having a color different from that of the polymer material for sheathing the synthetic cables and the metal cables. In other words, the fabric includes conducting yarns also uniformly distributed over the fabric. When these conducting yarns are cut following an attempted laceration, the electrical circuit into which these yarns have been inserted is therefore open, which thus allows the attempted laceration to be detected and indicated. The use of a conducting yarn sheathed with a PVC having a color different from the other yarns makes it easier to perform the operations of connecting it to the control devices.

In practice, the electrically conducting yarns may be selected from the group comprising wires based on nickel alloys and stainless steel wires.

In practice, the electrically conducting yarns are uniformly spaced by a distance of less than 300 millimeters and preferably less than 50 millimeters.

In one particular embodiment, the metal cables intended for mechanically resisting laceration may also be used for their electrical conduction properties. In other words, the metal cables intended to resist laceration are advantageously used as electrical conductors.

In one particular embodiment, the electrically conducting yarns may be connected in series along the selvedges of the textile, so as to form an electrical continuity and a single electrical circuit for the textile. The mechanically resistant metal cables may be electrically connected to the conducting cables in order to be integrated into the electrical detection circuit.

Advantageously, the textile may be associated with a device for measuring the electrical resistance of the conducting yarns, which are possibly associated with the metal cables. As soon as this resistance becomes too high, since the current flowing through the electrical yarns becomes zero following a successful laceration, this means that at least one conducting yarn has been cut and that an attempted laceration has therefore taken place.

The textile according to the invention may be used by itself or may be incorporated into a textile complex, of which it constitutes one of the layers. In the latter case, it may be advantageously associated with a coated textile in order to form a truck tarpaulin for example, which is reinforced only in the area where the characteristic layer is present. Thus, it is possible to reinforce only the lower part of a truck tarpaulin and to leave the upper part of the tarpaulin free of protective layer, and therefore lighter.

It is also possible to use the textile according to the invention in the form of a tape, or of relatively narrow bands, in order to form laceration-resistant straps. In this case, these bands may be placed in appropriate places in the textile complex in order to provide the tarpaulin with localized protection.

BRIEF DESCRIPTION OF THE FIGURES

The way in which the invention is realized and the advantages which ensue therefrom will become clearly apparent from the description of the embodiment which follows, supported by the appended figures in which.

MANNER OF REALIZING THE INVENTION

As already mentioned, the invention relates to a textile possessing antilaceration properties, which may be used by itself or in association with another textile, especially to form tarpaulins and, in particular, truck tarpaulins.

Figure 1:
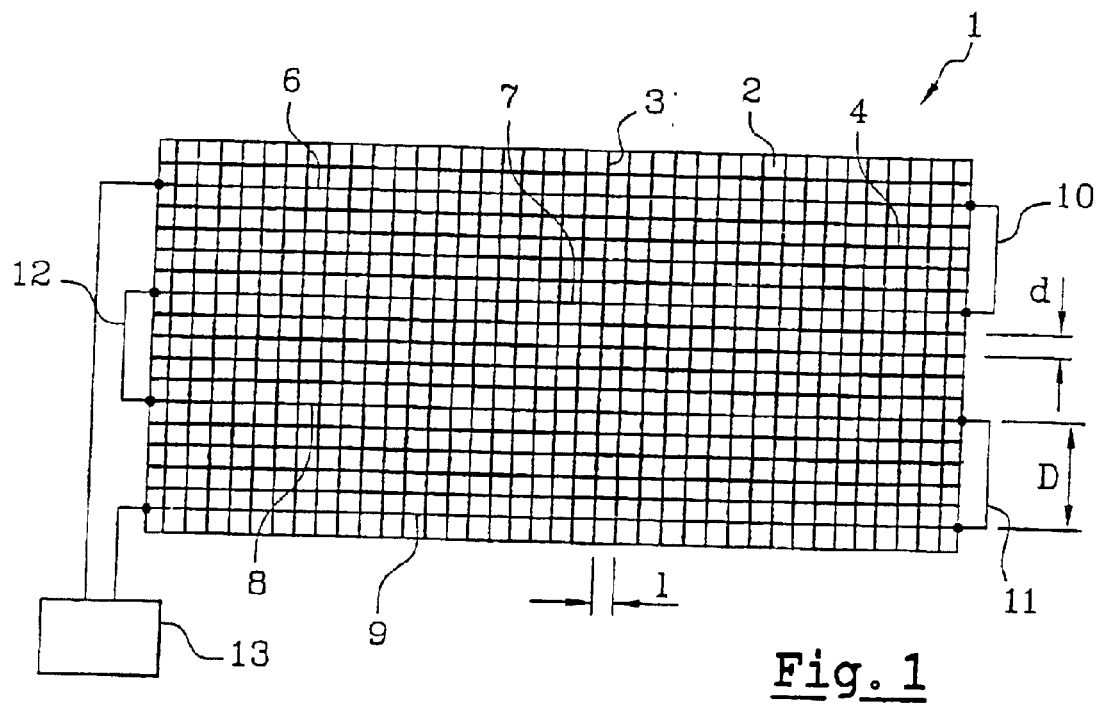
FIG. 1 is a schematic view of a textile produced in accordance with the invention, associated with a loop opening detection device.

One particular example of such a textile is described in FIG. 1. In its warp direction, such a textile (1) comprises polyester cables (2) sheathed with PVC and metal cables (3) also sheathed with PVC.

More specifically, and in one particular embodiment example, the cables consist of 1100-dtex high-tenacity polyester yarns. These cables are sheathed with a conventional PVC sheath.

The metal cables (3) used consist of wires based on carbon steel, of the type of those used in radial tire carcasses. These steel cables possess a tensile strength of greater than 350 kilograms per square millimeter. These metal cables are sheathed with PVC. As already mentioned, the colors of the PVC for sheathing the polyester cables and the metal cables are different in order to display their position and make it easier to perform the operations of making up and producing electrical loops.

In the warp direction, the textile possesses 10 warp cables per centimeter and the metal cables are placed either by themselves or in groups of two or more in order to provide further laceration resistance. The metal cables are separated from each other by a distance 1 equal to 45 millimeters.

In the weft direction, the textile according to the invention comprises sheathed polyester cables (2) identical to those used for the warp cables. It also includes sheathed metal cables (4) identical to those (3) used for the warp cables. In the weft direction, the textile comprises 10 polyester cables per centimeter. The metal cables are placed by themselves, or in groups of two or more in order to provide further laceration resistance The metal cables are separated by a distance d, also equal to 45 millimeters. This allows a square mesh cell with sides of 45 millimeters to be defined, this being close enough to prevent one's hand passing through it.

In accordance with another feature of the invention, the textile also includes, in the weft direction, electrically conducting yarns (6–9), which are advantageously wires made of lacquered copper or nickel alloys. These conductors (6–9) are distributed in the weft direction and are separated by a distance D of about 45 millimeters. In one embodiment (not illustrated), the distances d and D may be equal so that the strong metal cables and the conducting alarm wires alternate.

In one particular embodiment, the metal cables intended to resist laceration may advantageously be used as electrical conductors in the weft direction.

Of course, the above values are merely given as an example, and the invention is not limited to this single particular example. On the contrary, it encompasses various alternative embodiments regarding the composition of the metal cables, the conducting yarns and the synthetic cables used between the metal cables.

According to another feature of the invention, and as illustrated in FIG. 1, the electrically conducting yarns (6–9) may be connected in series by conducting portions (10–12) located along the selvedges of the fabric. In this way, the conducting yarns (6–9) together form a circuit which may be connected to a measuring device (13). This measuring device may, for example, compare the resistance of the circuit (6–9) which is connected to it and initiate an action when this resistance exceeds a predetermined threshold meaning that the circuit has been cut and that a laceration has been made. This device may be connected to other monitoring and control members, and especially to alarms and/or signaling devices.

The textile illustrated in FIG. 1 may be used as such, since all of the components, including the metal cables, are sheathed with PVC and therefore corrosion resistant. Nor do they expose the user to any electrical risk, since the various conducting yarns are also sheathed and the voltages employed fall within the "very low voltage" category.

Figure 2:
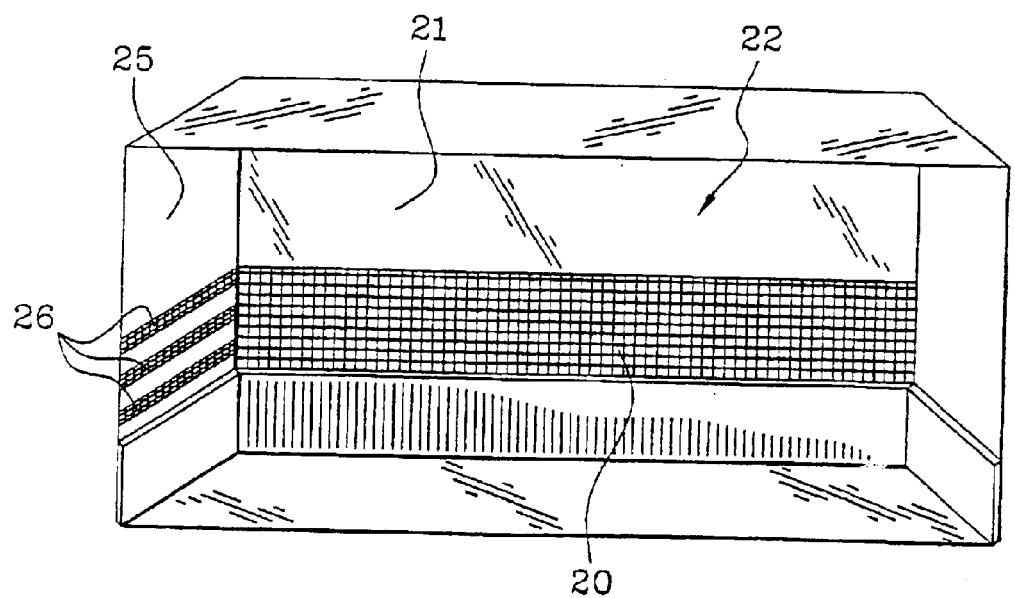
FIG. 2 is a summary perspective view of the inside of a truck trailer furnished with a tarpaulin incorporating the textile according to the invention, in two different embodiments.

As already mentioned, this textile may be used in association with another layer, in order to form a complex. This complex may include a textile web occupying the entire width or part of the width of the complex, as illustrated in FIG. 2. In this case, the textile (20) according to the invention may be associated with a tarpaulin (21) formed from a coated textile. This complexing operation may be carried out by various known methods, and especially by heat welding or by adhesive bonding.

In the embodiment illustrated in FIG. 2, only the bottom part of the tarpaulin (22) is protected from vandalism, but the entire height of the tarpaulin may, of course, be furnished with the characteristic reinforcing fabric of the invention.

On one side of the tarpaulin illustrated in FIG. 2, it includes tapes or bands (26) made from the textile according to the invention. These bands (26) have a width of between 5 and 40 centimeters. These tapes or bands are obtained by cutting them from a larger width of the same textile or a more dense textile according to the invention.

The width of these tapes (26) is greater than the spacing separating the metal cables (3, 4) in order to confer the characteristic laceration properties. If the fabric includes conducting yarns (6–9), this minimum width is greater than the spacing separating two conducting yarns.

Although not illustrated, the various textiles according to the invention based on the tarpaulins illustrated in FIG. 2 may be connected to detection devices, as illustrated in FIG. 1.

It emerges from the foregoing that the textile according to the invention gives tarpaulins, or more generally existing textiles, antilaceration properties thanks to a complexing arrangement which may be localized and optimized. The tarpaulins thus produced possess, on the one hand, the esthetic properties associated with the production of tarpaulins as such and, on the other hand, added to them, the antilaceration properties conferred by the reinforcement made of the characteristic textile of the invention.

Industrial Applications

The textile according to the invention can be used in many applications. As an example, mention may be made of the production of truck tarpaulins, in association with other impervious textiles. The textile according to the invention can also be used as cladding or, more generally, as an architectural element such as vertical partition walls which have to withstand attempts at laceration.

As an example, mention may be made of the partitions in areas of an airport which are used to define administrative boundaries, while allowing the passage of light and visibility through the partition.

What is claimed is:

1. A textile (1) possessing antilaceration properties, having an open weave made from synthetic cables (2) sheathed with a polymer material, and
includes, in the warp direction and the weft direction, metal cables (3, 4) sheathed with a polymer material having a different color for identification thereof from that of the polymer material for sheathing the synthetic yarns,
wherein the warp and weft metal cables (3, 4) are uniformly spaced by a distance of (d, l) of less than 80 millimeters.

2. The textile as claimed in claim 1, wherein the metal cables consist of wires based on carbon steel and wherein the synthetic cables consist of polyester yarns.

3. The textile as claimed in claim 1, which includes, in the warp or weft direction, electrically conducting yarns (6–9) sheathed with a polymer material, having a color different from that of the polymer material for sheathing the synthetic cables.

4. The textile as claimed in claim 3, wherein the electrically conducting yarns are selected from the group consisting of wires based on a nickel alloy and stainless steel wires.

5. The textile as claimed in claim 3, wherein the electrically conducting yarns are uniformly spaced by a distance (D) of less than 50 millimeters.

6. The textile as clamed in claim 3, wherein electrically conducting yarns (6–9) and/or metal cables (3, 4) are connected in series along the selevedges of the textile.

7. The textile as claimed in claim 6, which is associated with a device (13) for measuring the electrical resistance of the electrically conducting yarns and/or of the metal cables (3, 4) connected in series.

8. The textile as claimed in one of the preceding claims, which is in the form of a tape.

9. A textile complex comprising plural plies, which includes a ply consisting of a textile as claimed in claim 1.

10. In a cladding material comprising a textile, the improvement wherein said textile comprises the textile of claim 1.

11. In a tarpaulin comprising a textile fabric, the improvement wherein said textile fabric is the textile of claim 1 or claim 9.

12. In a tarpaulin comprising a textile fabric, the improvement wherein said tarpaulin is reinforced with a second textile, said second textile being the textile of claim 1.

13. The textile of claim 1 wherein said polymer material is polyvinyl chloride.

14. A textile possessing antilaceration properties, comprising
first and second cables extending in a warp direction, and first and second cables extending in a weft direction,
said warp and weft cables defining an open weave with rectangular spaces located between at least some adjacent cables, said rectangular spaces being sufficiently large to allow the passage of light and visibility therethrough, and impart flexibility to said textile,
said first warp and weft cables being metallic sheathed with a first polymer material, and said second warp and weft cables being nonmetallic and being sheathed with a second polymer material,
a plurality of said second warp and weft cables extending respectively between pairs of said first warp and weft cables, whereby the number of said second warp and weft cables substantially exceeds the number of said first warp and weft cables,
adjacent first warp cables being spaced from one another by a distance of less than 80 mm,
adjacent first weft cables being uniformly spaced from one another by a distance of less than 80 mm, and
means for distinguishing said first warp and weft cables from said second warp and weft cables, comprising said first polymer material having a first color on its surface, and said polymer material having a second color on its surface, and first color being different from said second color.

15. The textile of claim 4, wherein said first and second polymer materials are both polyvinylchloride.

* * * * *